(12) United States Patent
Kamber et al.

(10) Patent No.: US 11,353,133 B2
(45) Date of Patent: Jun. 7, 2022

(54) SECURING DEVICE FOR ATTACHING TO A LEDGE OF AN ACTUATING DRIVE HOUSING

(71) Applicant: Siemens Schweiz AG, Zürich (CH)

(72) Inventors: Pascal Kamber, Luchsingen (CH); Lucian Bischof, Ladir (CH); Beat Gantenbein, Castrisch (CH)

(73) Assignee: SIEMENS SCHWEIZ AG, Zurich (CH)

( * ) Notice: Subject to any disclaimer, the term of this patent is extended or adjusted under 35 U.S.C. 154(b) by 255 days.

(21) Appl. No.: 16/618,500

(22) PCT Filed: May 17, 2018

(86) PCT No.: PCT/EP2018/062906
§ 371 (c)(1),
(2) Date: Dec. 2, 2019

(87) PCT Pub. No.: WO2018/219668
PCT Pub. Date: Dec. 6, 2018

(65) Prior Publication Data
US 2021/0148482 A1 May 20, 2021

(30) Foreign Application Priority Data
May 31, 2017 (DE) .................... 10 2017 209 102.9

(51) Int. Cl.
*F24F 13/14* (2006.01)
*F16K 31/04* (2006.01)

(52) U.S. Cl.
CPC ........ *F16K 31/041* (2013.01); *F24F 13/1426* (2013.01); *F24F 2013/1433* (2013.01)

(58) Field of Classification Search
CPC .. F24F 13/1426; F24F 2013/1433–148; F16K 31/00; F16K 31/04; F16K 31/041;
(Continued)

(56) References Cited

U.S. PATENT DOCUMENTS

| 5,653,079 A | * | 8/1997 | Loeffler ................ E04B 1/2608 403/396 |
| 5,927,682 A | * | 7/1999 | Gul ........................ F16K 31/045 251/77 |

(Continued)

FOREIGN PATENT DOCUMENTS

| CN | 2781112 Y | 5/2006 | ............. F16K 35/00 |
| CN | 204403538 U | 6/2015 | ............. F16K 35/00 |

(Continued)

OTHER PUBLICATIONS

International Search Report and Written Opinion, Application No. PCT/EP2018/062906, 18 pages.

*Primary Examiner* — Edelmira Bosques
*Assistant Examiner* — Michael James Giordano
(74) *Attorney, Agent, or Firm* — Slayden Grubert Beard PLLC

(57) ABSTRACT

Various embodiments include a device securing an actuating drive on a duct outer face of an HVAC duct against rotation. The actuating drive includes an actuator for driving an actuation connection about an actuation axis. The actuation connection interacts with a flap arranged in the ventilation duct to set a gaseous volumetric flow. The actuating drive includes a housing with a ledge formed on a bottom side of the housing and surrounding the actuation connection coaxially relative to the actuation axis. The housing bottom side lies opposite the duct outer face. The device may include: a fastening part for fastening to the outer face; and a fork-shaped receptacle formed at an end. The receptacle geometrically matches a radial outer face of the housing ledge such that after lateral sliding onto the outer face of the ledge, the receptacle fixes said ledge and thus the actuating drive against rotation.

10 Claims, 2 Drawing Sheets

(58) Field of Classification Search
CPC ...... F16K 31/043; F16K 31/045; F16K 31/05; F16K 31/055
See application file for complete search history.

(56) References Cited

U.S. PATENT DOCUMENTS

| | | | |
|---|---|---|---|
| 6,431,203 B1 | 8/2002 | Zhu et al. | 137/315.01 |
| 6,530,557 B1 | 3/2003 | Guzorek | 251/129.12 |
| 2008/0143540 A1* | 6/2008 | Savla | F16K 35/06 |
| | | | 340/605 |
| 2008/0173838 A1 | 7/2008 | Schmidig et al. | 251/129.11 |
| 2009/0114862 A1* | 5/2009 | Lehnert | F16K 1/221 |
| | | | 251/129.11 |
| 2017/0241560 A1* | 8/2017 | Bakken | F16D 1/087 |
| 2017/0268433 A1 | 9/2017 | Aigner et al. | |

FOREIGN PATENT DOCUMENTS

| | | | |
|---|---|---|---|
| CN | 204879001 U | 12/2015 | ............ F16K 35/00 |
| CN | 205781130 U | 12/2016 | ............ F16K 15/04 |
| WO | 2007/006162 A1 | 1/2007 | ............ A62C 2/24 |
| WO | WO 2007/006162 A1 | 7/2007 | |
| WO | WO 2007/098620 A1 | 7/2007 | |
| WO | 2007/098620 A1 | 9/2007 | ............ F16K 31/04 |
| WO | 2016/091565 A1 | 6/2016 | ............ F02D 9/04 |
| WO | 2016/096275 A1 | 6/2016 | ............ F16D 1/033 |
| WO | WO 2016/091565 A1 | 7/2016 | |
| WO | 2018/219668 A1 | 12/2018 | ............ F16K 1/22 |

\* cited by examiner

SECURING DEVICE FOR ATTACHING TO A LEDGE OF AN ACTUATING DRIVE HOUSING

CROSS-REFERENCE TO RELATED APPLICATIONS

This application is a U.S. National Stage Application of International Application No. PCT/EP2018/062906 filed May 17, 2018, which designates the United States of America, and claims priority to DE Application No. 10 2017 209 102.9 filed May 31, 2017, the contents of which are hereby incorporated by reference in their entirety.

TECHNICAL FIELD

The present disclosure relates to actuators. Various embodiments may include devices for securing an actuating drive attached to a duct outer face of a ventilation duct against rotation during operation.

BACKGROUND

Some actuating drives comprise an actuator for driving an actuation connection about an actuation axis. In HVAC applications, the actuation connection may interact with a flap arranged in the ventilation duct to set a gaseous volumetric flow, in particular for the heating, ventilation, or air conditioning of a building. Typically, the actuating drive has a housing with a ledge which is formed on a bottom side of the housing and surrounds the actuation connection coaxially to the actuation axis. The bottom side of the housing faces the duct outer face. Devices of this type are described e.g. from U.S. Pat. No. 6,530,557B1, from WO 2007/098620 A1, from WO 2007/006162 A1 or from U.S. Pat. No. 6,431,203 B1.

An actuating drive of this type is secured against rotation so that the torque transmitted from the actuating drive to the actuation connection can further be transmitted to the flap connected therewith in the interior of the ventilation duct. To this end a torque support is required. The afore-mentioned device therefore functions as a torque support. The actuating drive which is also referred to as actuator typically has an electric motor, a transmission typically arranged downstream hereof and an actuation connection on the transmission side for connecting the flap. In order to set the desired volume or air flow, the actuating drive moves the actuation connection about a corresponding actuating angle. The ventilation duct preferably has a round or rectangular cross-section. It can also be referred to as ventilation pipe, ventilation tube, or ventilation channel.

Securing against rotation typically includes using additional connecting elements, such as e.g. screws, nuts, rivets and perforated rails and welded sheet metal. In this case the perforated rails or sheet metal would be permanently attached to the ventilation duct and the actuating drive then fastened to the perforated rails or to the sheet metal by means of the connecting elements. The actuating drive was thus secured against rotation. The previously cited measures are complicated and inflexible.

SUMMARY

The teachings of the present disclosure describe an improved device for securing an actuating drive against rotation. For example, some embodiments may include a device (DS) for securing an actuating drive (1) attached to a duct outer face (RA) of a ventilation duct (R) against rotation during operation, wherein the actuating drive (1) has an actuator for driving an actuation connection (SA) about an actuation axis (A), wherein the actuation connection (SA) interacts with a flap arranged in the ventilation duct (R) to set a gaseous volumetric flow, in particular for the heating, ventilation or air conditioning of a building, wherein the actuating drive (1) has a housing (2) with a ledge (3) which is formed on a bottom side (US) of the housing (2) and surrounds the actuation connection (SA) coaxially relative to the actuation axis (A), and wherein the housing bottom side (US) lies opposite the duct outer face (RA), characterized in that the device (DS) has a fastening part (BT) for fastening to the duct outer face (RA) and a fork-shaped receptacle (G) formed at its remote end, wherein the receptacle (G) is matched geometrically to a radial outer face (AA) of the housing ledge (3) such that after lateral sliding onto the outer face (AA) of the ledge (3), the receptacle (G) fixes said ledge (3) and thus the actuating drive (1), by means of interlocking connection, against rotation about the actuation axis (A).

In some embodiments, the bottom side (US) of the housing (2) lies opposite the duct outer face (RA) at a predetermined distance (DIST), wherein the device (DS) comprises a central connecting part (ZT), wherein the connecting part (ZT) is located between the fastening part (BT) and the fork-shaped receptacle (G) and wherein in each case a bending point (BS) is present between the connecting part (ZT) on the one hand and the fastening part (BT) and the receptacle (G) on the other hand in order to enable a manual adjustment of the device (DS) to the distance (DIST).

In some embodiments, the device (DS) is in one piece and is produced from a metal sheet, in particular from an iron or aluminum sheet, or from a plastic plate.

In some embodiments, the bending points (BS) are realized by introducing slots (SL) into the metal sheet or into the plastic plate, or by reducing a sheet strength (ST) in the metal sheet or a plate strength (ST) in the plastic plate.

In some embodiments, the device (DS) produced from metal sheet or from plastic plate has a uniform sheet or plate strength (ST).

In some embodiments, the fork-shaped receptacle (G) has a maximum fork width (GW), wherein the maximum fork width (GW) is matched with respect to its measurements to the radial outer face (AA) of the housing ledge (3) with a regular, convex, polygonal outer contour.

In some embodiments, the fork-shaped receptacle (G) has a uniform form width (GW), wherein the uniform fork width (GW) is matched with respect to its dimension to the radial outer face (AA) of the housing ledge (3) with a regular, convex, polygonal outer contour with an even number of corners, in particular in the rage of 4 to 16.

In some embodiments, the fork-shaped receptacle (G) has a uniform fork thickness (D), wherein the ledge (3) on the housing (2) of the actuating drive (1) has a groove (N) which runs preferably completely around its radial outer face (AA) and has a groove depth (T) and an axial groove width (AW) and wherein the uniform fork width (GW) and the uniform fork thickness (D) is matched to the radial outer face (AA) of the housing ledge (3) with the groove (N), so that after lateral sliding into the groove (N) of the ledge (3) the fork-shaped receptacle (G) fixes this ledge (3) and thus the actuating drive (1), by means of interlocking connection, additionally against movements of the actuating drive (1) along the actuation axis (A).

In some embodiments, the fork-shaped receptacle (G) has a fork depth (GT) which is measured so that after lateral sliding onto the radial outer face (AA) of the ledge (3) the receptacle (G) encompasses at least half of the outer contour of the ledge (3) in particular in a flush manner.

In some embodiments, the receptacle (G) has a fork depth (GT) which is measured so that after lateral sliding onto the radial outer face (AA) of the ledge (3), the fork-shaped receptacle (G) comprises a number of edges of the regular, convex, polygonal outer contour with an even number of corners, wherein the number of edges corresponds to half the number of corners plus 1.

BRIEF DESCRIPTION OF THE DRAWINGS

The teachings herein and advantageous embodiments thereof are described by reference to the accompanying drawings, in which.

DETAILED DESCRIPTION

Figure 1:
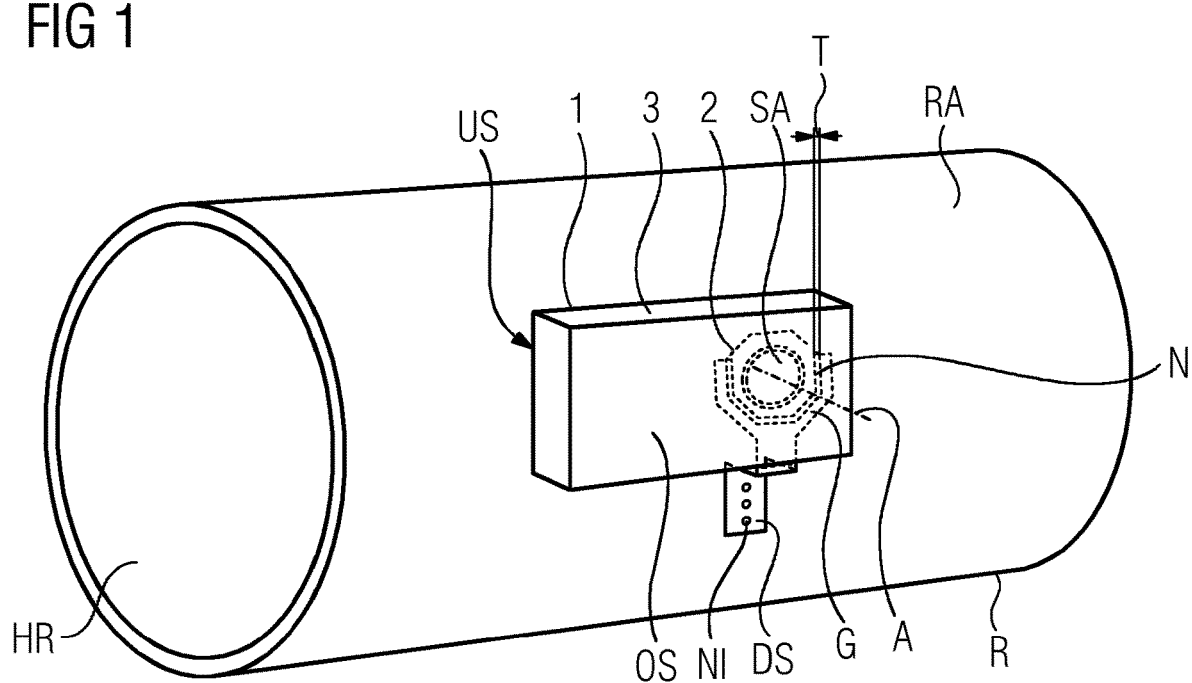
FIG. 1 shows an exemplary ventilation duct with a round cross-section and with an actuating drive attached thereto and a device incorporating the teachings herein.

In some embodiments, the device has a fastening part for fastening to the duct outer face and a fork-shaped receptacle embodied at its remote end. The receptacle is geometrically matched to a radial outer face of the housing ledge so that after lateral sliding onto the outer face of the ledge, the receptacle fixes this ledge and thus the actuating drive, by means of interlocking connection, against rotation about the actuation axis. Directions toward the actuation axis and away herefrom are referred to as "radial". The fork-shaped receptacle with the interposed actuation axis may make possible a direct torque input. Moreover, the fork-shaped receptacle fixes the actuating drive against radial movements in respect of the actuation axis by means of form fit.

The device typically has an overall length, measured from the fastening part up to the two fork ends of the fork-shaped receptacle, in the range of 10 to 40 cm, in particular in the range of 15 to 25 cm. Furthermore, the device typically has an overall width above all, measured at right angles to the overall length, in the range of 3 to 10 cm, in particular in the range of 4 to 8 cm.

In some embodiments, the bottom side of the housing faces the duct outer face at a (predetermined) distance. The device comprises a central connecting part, which is located between the fastening part and the fork-shaped receptacle. A bending point for manually adjusting the device to the distance is present between the central connecting part on the one hand and the fastening part and the fork-shaped receptacle on the other hand.

In some embodiments, the device is in one piece. It may be produced from metal sheet, in particular from an iron or aluminum metal sheet. The device is in particular a stamped part made from metal sheet. In some embodiments, the device can be produced from a plastic plate.

In some embodiments, the bending points are realized by introducing slots into the metal sheet or into the plastic plate. In some embodiments, the bending points can be realized by reducing a plate thickness in the metal sheet or a plate strength in the plastic plate. The strength of the metal sheet or the plastic plate typically lies in a range of 1 to 10 mm, e.g. in a range of 2 to 6 mm. In some embodiments, the device produced from metal sheet or from the plastic plate has a uniform sheet or plate strength.

In some embodiments, the fork-shaped receptacle has a maximum fork width. The latter is matched, with respect to its dimensions, to the radial outer face of a housing ledge with a regular, convex, polygonal outer contour. In the case of polygonal outer contours with an uneven number of corners, such as e.g. 3, 5, or 7, the maximum fork width is then at the two fork ends. As a result, it is advantageously possible to attach the inventive device at various different angular positions, such as, e.g. at angular increments of 45° with a polygonal outer contour with 8 corners.

In some embodiments, the fork-shaped receptacle has a uniform and thus identical fork width in terms of an open-end spanner or open-end wrench. The uniform fork width is matched with respect to its dimensions to the radial outer face of a housing ledge with a regular, convex, polygonal outer contour with an even number of corners, in particular in the range of 4 to 16. As a result, a laterally more stable enclosure compared with polygonal outer contours with uneven number of corners is possible by means of the fork-shaped receptacle.

In some embodiments, the fork-shaped receptacle has a uniform fork thickness. The ledge on the housing of the actuating drive has a groove which runs preferably completely around its radial outer face with a groove depth and with an axial groove width. "Axial" refers to directions parallel to the actuation axis. The uniform fork width and fork thickness are matched to the radial outer face of the housing ledge with the groove, so that after lateral sliding into the groove on the radial outer face of the ledge, the fork-shaped receptacle additionally advantageously fixes this ledge and thus the actuating drive against movements of the actuating drive along the actuation axis, i.e. parallel to the actuation axis, by means of interlocking connection. The uniform fork thickness may match the uniform sheet strength or plate strength of the inventive device.

In some embodiments, the fork-shaped receptacle has a fork depth, which is measured so that after lateral sliding onto the radial outer face of the ledge, the receptacle encloses at least half of the outer contour of the housing ledge in particular in a flush manner. By enclosing the housing ledge, a particularly stable torque support can be realized beyond half of the outer contour.

In some embodiments, the receptacle has a fork depth, which is measured so that after lateral sliding onto the radial outer face of the ledge, the fork-shaped receptacle comprises a number of edges of the regular, convex, polygonal outer contour with an even number of corners, wherein the number of edges corresponds to half the number of corners plus 1.

FIG. 1 shows an exemplary ventilation duct R with a round cross-section and with an actuating drive 1 attached thereto and an device DS incorporating teachings of the present disclosure. RA refers to the duct outer face and HR to a cavity embodied in the ventilation duct R for transporting air, in particular. The actuating drive 1 shown has an actuation connection SA, which interacts with a flap (not visible in this display) arranged in the ventilation duct R for adjusting an air flow. The actuating drive 1 shown has a housing 2 with a ledge 3 embodied on a bottom side US of the housing 2. The bottom side US faces a top side OS of the housing 2.

The ledge 3 can also be referred to as housing flange. The housing itself may be a cast metal housing. It can alternatively be produced from plastic by means of an injection molding method. The ledge 3 may be an integral part of the housing 2 and is thus fixedly connected to the housing 2.

The ledge 3 shown surrounds the actuation connection SA coaxially with respect to the actuation axis A. In particular, the ledge 3 surrounds the actuation connection SA at a minimal distance, such as e.g. in the region of 0.1 to 5 mm, so that during an actuating movement the actuation connection SA can rotate freely about the actuation axis A. The actuating drive 1 is attached or mounted on the duct outer face RA, so that its housing bottom side US lies opposite the duct outer face RA.

As shown in FIG. 1, the device DS is fastened to the one end of the device DS by means of three fastening means NI, such as e.g. by means of rivets. The opposing, dashed end of the device DS shows a fork-shaped receptacle G. After lateral sliding onto a radial outer face of the ledge 3, this fork-shaped receptacle fixes this ledge 3 and thus the entire actuating drive 1 shown against a rotation about the actuation axis A, namely according to the invention directly or as close as possible to the actuation connection SA, by means of interlocking connection.

In the example in FIG. 1, the ledge 3 or the housing flange has a regular, convex, polygonal outer contour with eight corners and consequently also with eight edges in the form of a nut. As a result, the device DS can be fastened at 45° angular steps and thus flexibly and according to the requirements on site on the duct outer face RA. In this regard N refers to a peripheral groove on the radial outer face of the ledge 3. The groove N has a groove depth T, e.g. in the region of 1 to 5 mm. During the manufacturing process of the housing 2, the groove N can already be recessed or subsequently introduced into the radial outer face of the ledge 3, e.g. by means of machining.

Figure 2:
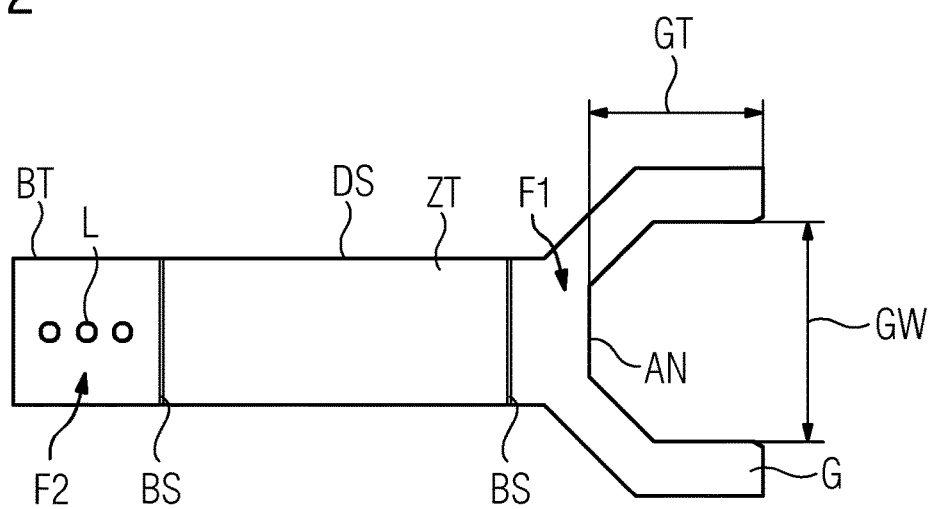
FIG. 2 shows an example of a device incorporating the teachings herein with a fastening part and with a fork-shaped receptacle.

FIG. 2 shows an example of a device DS with a fastening part BT and with a fork-shaped receptacle G incorporating teachings of the present disclosure. In the top view shown, the entire device DS is similar to the form of an open-end spanner or an open-end wrench. The fastening part BT has three holes L or boreholes for fastening to the duct outer face RA using rivets NI. A central connecting part ZT is present between the fastening part BT and the fork-shaped receptacle G. A bending point BS is present between the central connecting part ZT on the one hand and the fastening part BT and the fork-shaped receptacle G on the other hand. All three parts BT, ZT, G are rigid and laminar, in particular designed to be flat.

"Rigid" is understood to mean that the three parts BT, ZT, G can be manually bent about the bending points BS relative to one another, without the three parts BT, ZT, G deforming themselves plastically. F1 and F2 refer to the respective outer face of the fastening part BT and the fork-shaped receptacle G. If the three parts BT, ZT, G are bent relative to one another in such a way that the two surfaces F1, F2 are oriented identically in the sense of a parallelogram, in anticipation of subsequent FIG. 3, an adjustment can be easily made to the device DS in order to bridge the gap between the duct outer face RA and the bottom side US of the actuating drive housing 2. A fork depth and a fork width are referred to with GT and GW respectively. AN refers to a stop, which, after fitting the fork-shaped receptacle G to the housing ledge 3, runs against its radial outer face.

Figure 3:
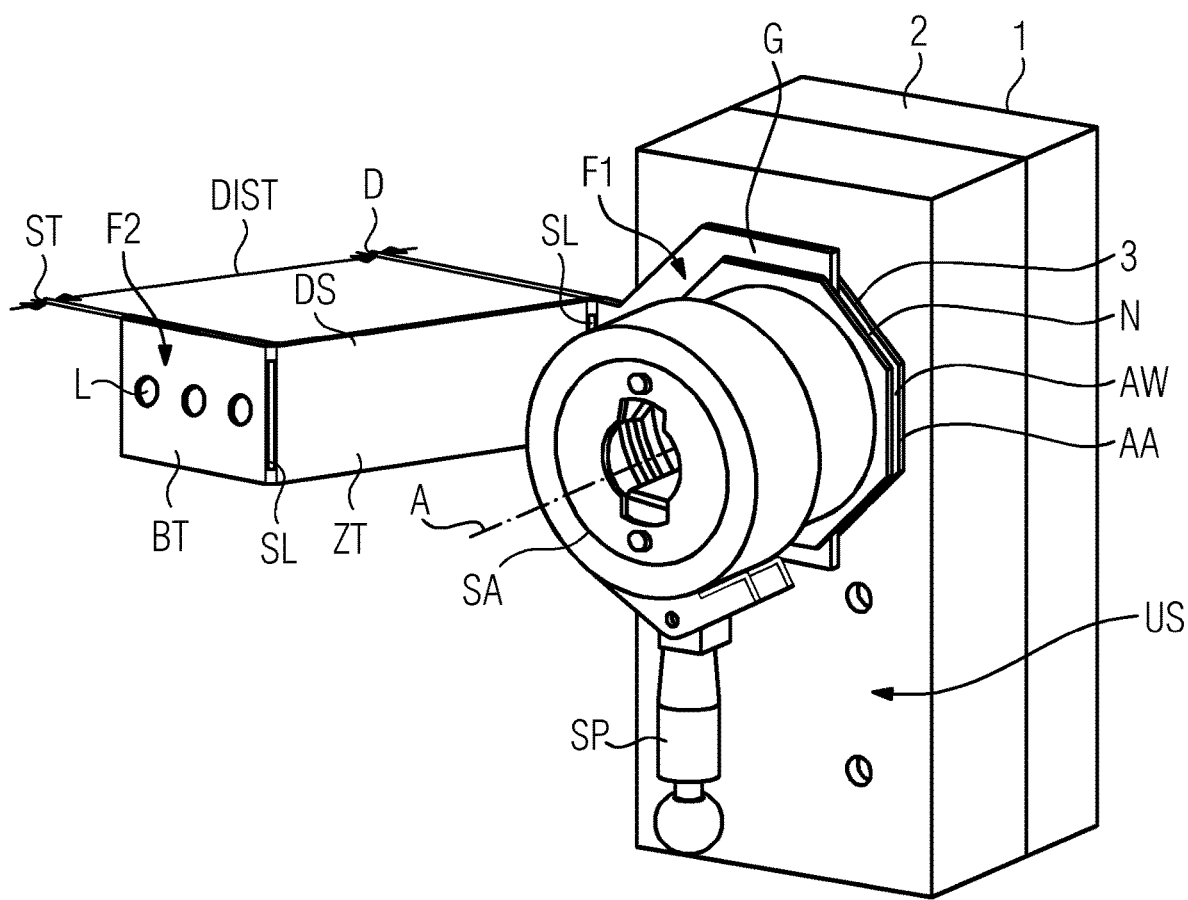
FIG. 3 shows a perspective view on a bottom side of the actuating drive according to FIG. 1 with an inventive device engaging with a groove on a radial outer face of a ledge of the actuating drive.

FIG. 3 shows a perspective view of a bottom side US of the actuating drive 1 according to FIG. 1 with a device DS engaging with a groove N on the radial outer face AA of a housing ledge 3 incorporating teachings of the present disclosure. It is clear in this display, how a predetermined distance DIST between the housing bottom side US and a duct outer face (RA) can be produced by suitable manual bends on the inventive device DS and can thus be bridged. The distance DIST is here dependent on the type of actuating drive 1 used and on the embodiment of a manual clamping device SP at the actuation connection SA, which is provided to fasten the actuation connection SA to a flap connection (not shown further) for the flap in the cavity HR of the ventilation duct R.

Furthermore, FIG. 3 shows the two bending points BS, which are realized by introducing two slots SL into the device DS. The device DS shown is stamped in one piece from sheet metal. The two slots SL are also introduced through stamping in each case. The entire "metal sheet" has a uniform sheet strength ST, which is identical to a uniform fork thickness D. The two outer surfaces F1, F2 are in turn aligned parallel to one another.

Furthermore, FIG. 3 shows how the fork-shaped receptacle G is slid laterally into the groove N on the radial outer face AA with no or minimal play. As a result, the actuating drive 1 is fixed against movements about the actuation axis A by way of the ledge 3, and also against movement along the actuation axis A.

LIST OF REFERENCE CHARACTERS 1 actuating drive, actuator
2 housing
3 ledge, housing flange
A actuation axis
AA radial outer face of the ledge
AN stop
AW axial groove width
BS bending points
BT fastening part
D thickness, fork thickness
DIS distance
DS device, torque support
F1, F2 surfaces
G fork-shaped receptacle, fork
GT fork depth
GW fork width
HR cavity
N groove, outer groove
NI fastening element, rivet, screw
OS top side of the actuating drive
SA actuation connection
SL slot
SP closure, clamping closure
ST sheet strength, plate strength
T groove depth
US bottom side of the actuating drive
ZT central connecting part

What is claimed is:

1. A device for securing an actuating drive attached to a duct outer face of a ventilation duct against rotation during operation, wherein the actuating drive includes an actuator for driving an actuation connection about an actuation axis, wherein the actuation connection interacts with a flap arranged in the ventilation duct to set a gaseous volumetric flow, wherein the actuating drive includes a housing with a ledge formed on a bottom side of the housing, the ledge surrounding the actuation connection coaxial with the actuation axis, and wherein the housing bottom side lies opposite the duct outer face, the device comprising:

a fastening part for fastening to the duct outer face; and
a fork-shaped receptacle formed at a remote end;

wherein the fork-shaped receptacle geometrically matches a radial outer face of the housing ledge such that after lateral sliding onto the outer face of the ledge, thereby surrounding the actuation axis at least in part, the receptacle fixes to said ledge and thus the actuating drive, by means of interlocking connection, against rotation about the actuation axis.

2. The device as claimed in claim 1, wherein:
the bottom side of the housing lies opposite the duct outer face at a predetermined distance;
the device further comprises a central connecting part located between the fastening part and the fork-shaped receptacle; and
two bending points located between the central connecting part and each of the fastening part and the receptacle enable a manual adjustment of the device to the distance.

3. The device as claimed in claim 1, wherein the device is in one piece and is produced from a plate comprising metal or plastic.

4. The device as claimed in claim 2, wherein the bending points comprise slots.

5. The device as claimed in claim 3, wherein the device has a uniform plate strength.

6. The device as claimed in claim 1, wherein the fork-shaped receptacle has a maximum fork width matched to the radial outer face of the housing ledge with a regular, convex, polygonal outer contour.

7. The device as claimed in claim 6, wherein the fork-shaped receptacle has a uniform form width matched to the radial outer face of the housing ledge with a regular, convex, polygonal outer contour with an even number of corners.

8. The device as claimed in claim 7, wherein:
the fork-shaped receptacle has a uniform fork thickness;
the ledge on the housing of the actuating drive has a groove running around a radial outer face of the ledge;
the groove has a groove depth and an axial groove width; and
the uniform fork width and the uniform fork thickness is matched to the radial outer face of the housing ledge, so that after lateral sliding into the groove of the ledge the fork-shaped receptacle fixes this ledge and thus the actuating drive, by means of interlocking connection, additionally against movements of the actuating drive along the actuation axis.

9. The device as claimed in claim 7, wherein the fork-shaped receptacle has a fork depth measured so that after lateral sliding onto the radial outer face of the ledge the receptacle encompasses at least half of the outer contour of the ledge in a flush manner.

10. The device as claimed in claim 9, wherein the receptacle has a fork depth measured so that after lateral sliding onto the radial outer face of the ledge, the fork-shaped receptacle comprises a number of edges of the regular, convex, polygonal outer contour with an even number of corners, wherein the number of edges corresponds to half the number of corners plus 1.

* * * * *